(12) United States Patent
Hockney et al.

(10) Patent No.: US 6,614,132 B2
(45) Date of Patent: Sep. 2, 2003

(54) MULTIPLE FLYWHEEL ENERGY STORAGE SYSTEM

(75) Inventors: Richard L. Hockney, Lynnfield, MA (US); Geoff B. Lansberry, Hingham, MA (US); Vladislav Davidkovich, Malden, MA (US); William T. Larkins, Manchester, NH (US); Emil Muchnik, Brighton, MA (US)

(73) Assignee: Beacon Power Corporation, Wilmington, MA (US)

( * ) Notice: Subject to any disclaimer, the term of this patent is extended or adjusted under 35 U.S.C. 154(b) by 0 days.

(21) Appl. No.: 09/998,112

(22) Filed: Nov. 30, 2001

(65) Prior Publication Data

US 2003/0102718 A1 Jun. 5, 2003

(51) Int. Cl.$^7$ .................................................. H02J 1/00
(52) U.S. Cl. ............................. 307/43; 307/64; 307/65; 307/66; 307/68; 307/82; 307/84
(58) Field of Search ............................. 307/43, 64, 65, 307/66, 68, 82, 84

(56) References Cited

U.S. PATENT DOCUMENTS 6,175,166 B1 * 1/2001 Bapat .......................... 307/64
6,184,593 B1 * 2/2001 Jungreis ....................... 307/64
6,198,176 B1 * 3/2001 Gillette ........................ 307/64
6,219,623 B1 * 4/2001 Wills .......................... 702/60
6,274,950 B1 * 8/2001 Gottlieb et al. ............... 307/66

* cited by examiner

Primary Examiner—Brian Sircus
Assistant Examiner—Robert L DeBeradinis
(74) Attorney, Agent, or Firm—David G. Conlin; William J. Daley, Jr.; Edwards & Angell, LLP

(57) ABSTRACT

An electrical energy storage system for supplying power to a load comprises a plurality of flywheel energy storage systems, each supplying a power output signal, and a connector circuit. The connector circuit connects the flywheel energy storage systems to the load, but the flywheel energy storage systems are not connected to each other. Each of the flywheel energy storage systems comprises a flywheel turning at an initially predetermined rate, a motor/generator coupled to the flywheel, a bi-directional inverter circuit coupled to the motor/generator and to the load, and a control circuit coupled to the motor/generator and the bi-directional inverter circuit. The control circuit controls the power output signal of the flywheel energy storage system independently of the other flywheel energy storage systems.

44 Claims, 7 Drawing Sheets

MULTIPLE FLYWHEEL ENERGY STORAGE SYSTEM

FIELD OF THE INVENTION

This invention relates to energy storage systems, and more particularly, to a system and method for balancing the power output of multiple flywheel energy storage systems.

BACKGROUND OF THE INVENTION

Modern electrical devices provide many important functions in today's world. However, these electrical devices are dependent upon a constant supply of electricity in order to perform their marvels. For example, a respirator in a hospital provides important breathing assistance to a patient, but when the electricity fails, it can no longer perform its life-saving function. Hence, it has become important to have a supply of uninterrupted power for critical applications. A reliable source of backup power is frequently called an uninterruptible power supply, or UPS.

One uninterruptible power supply is a battery backup system. In a battery backup system, a number of batteries are connected together to provide power when the main power supply fails. While battery backup can fill a gap in the supply of power to a critical load, it suffers from significant drawbacks. First, the batteries in the power supply are dangerous because they contain highly corrosive acid. Second, the batteries contain heavy metals, such as lead, which pose significant environmental hazards upon disposal. Third, it is not possible accurately to gauge the amount of reserve in a battery, as the power stored in a battery can only be tested under load. It is only when the battery system is in actual use that its power can be measured, and then it is too late to remedy a deficiency if the batteries are run down. Reliability is thus compromised in a battery backup system, as an operator of a critical application cannot know in advance how long a battery backup system will provide power.

As a result of the deficiencies of battery backup systems, flywheel energy storage systems have been developed. In a flywheel energy storage system, a flywheel, turning at a high rpm, drives a motor/generator. The motor/generator generates three-phase electrical current, which is supplied to a rectifier. The rectifier converts the three-phase alternating current from the motor/generator to a constant voltage DC output. The DC power output from the rectifier is supplied to the critical application or load.

Flywheel energy storage systems frequently employ two or more flywheels, each encased in a housing with associated components, in order to provide sufficient power. A multiple flywheel energy storage system may comprise a master-slave arrangement, including a master flywheel energy storage system and one or more slave flywheel energy storage systems, which operate under control of the master flywheel energy storage system. The master unit is connected in parallel with the slave units and to the critical application. Various connections must be supplied between the master unit and the slave units, utilizing complex, unreliable, and expensive circuitry. Of course, a master-slave arrangement is inherently unreliable in that if the master unit fails, the entire flywheel energy storage system is inoperable. However, problems arise in a multiple flywheel system without a master-slave arrangement, because only one of the flywheel units can supply power to the application at any moment in time. Only the flywheel energy storage unit with the highest voltage can supply power to the load. The next highest voltage unit then supplies power when the first unit runs down. Thus, a multiple flywheel energy storage system without a master-slave arrangement cannot supply power to a load that is greater than the output of any single flywheel energy storage unit.

SUMMARY OF THE INVENTION

In accord with the present invention, an electrical energy storage system for supplying power to a load comprises a plurality of flywheel energy storage systems, each supplying a power output signal, and a connector circuit. The connector circuit connects the flywheel energy storage systems to the load, but the flywheel energy storage systems are not connected to each other. Each of the flywheel energy storage systems comprises a flywheel turning at an initially predetermined rate, a motor/generator coupled to the flywheel, a bi-directional inverter circuit coupled to the motor/generator and to the load, and a control circuit coupled to the motor/generator and the bi-directional inverter circuit. The control circuit controls the power output signal of the flywheel energy storage system independently of the other flywheel energy storage systems.

Further in accord with the present invention, a method of supplying power to a load comprises the steps of providing a plurality of flywheel energy storage systems, each of which generates a power output signal having a nominal output voltage, calculating the power output of each of the flywheel energy storage systems to generate a calculated power signal associated with each, multiplying each of the calculated power signals by a predetermined amount to generate an associated correction signal, subtracting each of the associated correction signals from each of the nominal output voltages, and reducing the power output signal of each of the flywheel energy storage systems in response to the subtracting step independently of the others.

Also in accord with the present invention, in a backup power supply with at least two flywheel energy storage systems, the flywheel energy storage system comprises a flywheel turning at an initially predetermined rate, and a motor/generator coupled to the flywheel. A bi-directional inverter circuit is coupled to the motor/generator, and a control circuit is coupled to the motor/generator and the bi-directional inverter circuit for controlling the power output signal of the flywheel energy storage system. The control circuit controls the power output signal independently of the other flywheel energy storage systems.

Still further in accord with the present invention, a circuit is provided for balancing the load of a plurality of flywheel energy storage systems. Each of the flywheel energy storage systems supplies a power output signal with a nominal output voltage. The circuit comprises a power output calculation circuit for calculating the power output of each of the power output signals and generating a calculated power signal in response thereto, and a multiplier circuit associated with each of the flywheel energy storage systems for multiplying the calculated power signal by a predetermined amount to generate a correction signal. A subtracting circuit is associated with each of the flywheel energy storage systems for subtracting the correction signal from the nominal output voltage to generate an adjustment signal, and a circuit is associated with each of the flywheel energy storage systems responsive to the adjustment signal for reducing the power output signal of each of the flywheel energy storage systems independently of the others.

Even further in accord with the present invention, in a multiple flywheel energy storage system wherein each flywheel unit supplies a power output signal with a nominal output voltage and has a digital signal processor, a computer program product comprises a computer usable medium having computer readable program code embodied in the medium for causing an application program to execute on the digital signal processor. The computer program code includes a power output calculation program for calculating the power output of an associated one of the flywheel energy storage systems and generating a calculated power signal in response thereto, and a multiplier program for multiplying the calculated power signal by a predetermined amount to generate a correction signal. A subtracting program subtracts the correction signal from the nominal output voltage of the associated one of the flywheel energy storage systems to generate an adjustment signal. A program is responsive to the adjustment signal and reduces the power output signal of the associated one of the flywheel energy storage systems independently of the others.

Still further in accord with the present invention, a method of balancing the load of a plurality of flywheel energy storage systems, each of the flywheel energy storage systems supplying a power output signal having a nominal output voltage and a power output, comprises the steps of calculating the power output of each of the flywheel energy storage systems to generate a calculated power signal associated with each, multiplying each of the calculated power signals from each of the flywheel storage systems by a predetermined amount to generate associated correction signals, subtracting each of the associated correction signals from the nominal output voltages, and reducing the power output of each of the flywheel energy storage systems in response to the subtracting step independently of the others.

DETAILED DESCRIPTION OF THE PREFERRED EMBODIMENTS

Figure 1:
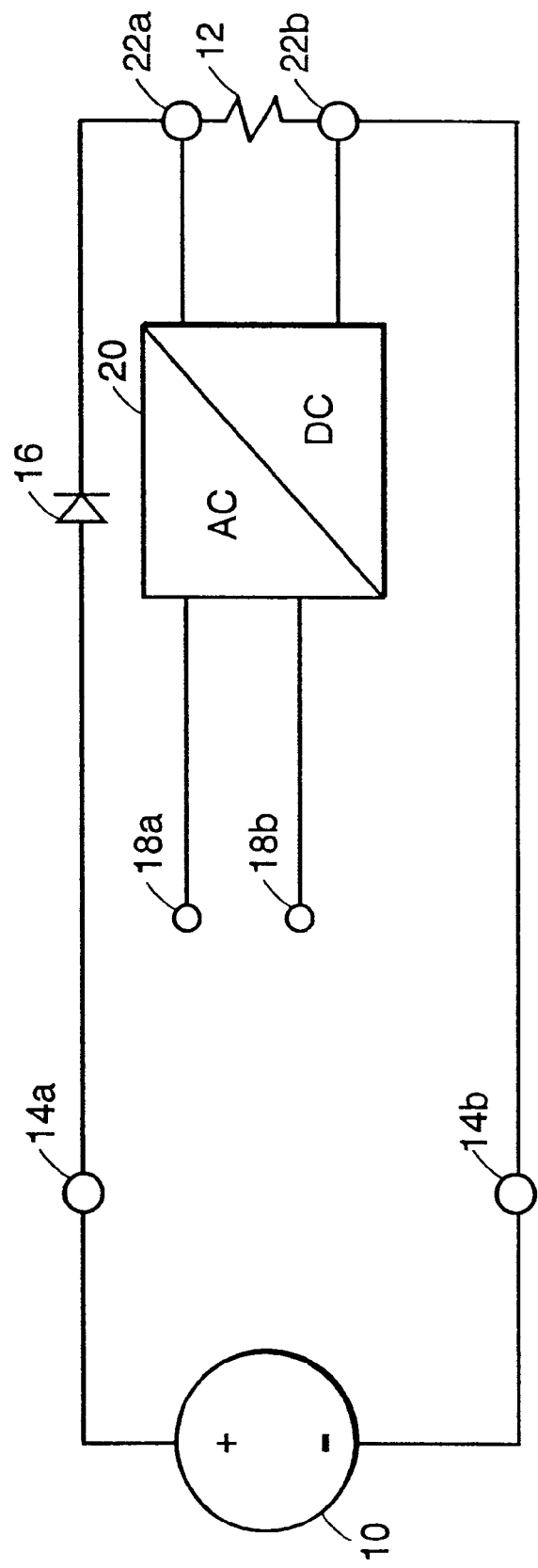
FIG. 1 is a schematic diagram of a prior art single flywheel energy storage system connected to a load.

Referring to the drawings, and initially to FIG. 1 thereof, a prior art flywheel energy storage system 10 is shown coupled to a critical load 12 through a pair of terminals 14a, 14b. The critical load 12 may be any application or electrical device for which a continuous supply of electricity is important, for example, the aforementioned respirator in a hospital. A diode 16 is disposed between the terminal 14a and the critical load 12. A source of power, such as that from an electricity main in a municipality, is supplied through terminals 18a, 18b to a rectifier 20, which converts the 120 volt AC to a DC power, where it is applied to the terminals 22a, 22b and thence, to the load 12. In one application, the rectifier 20 converted 120 volt AC power to 48 volt DC power. When the AC power is supplied to the critical load 12, the flywheel energy storage system 10 does not supply power to the load 12. However, when the AC power drops out, as, for instance, during a power failure, the flywheel energy storage system 10 supplies power to the critical load 12. This arrangement continuously supplies power to the critical load 12.

Figure 2:
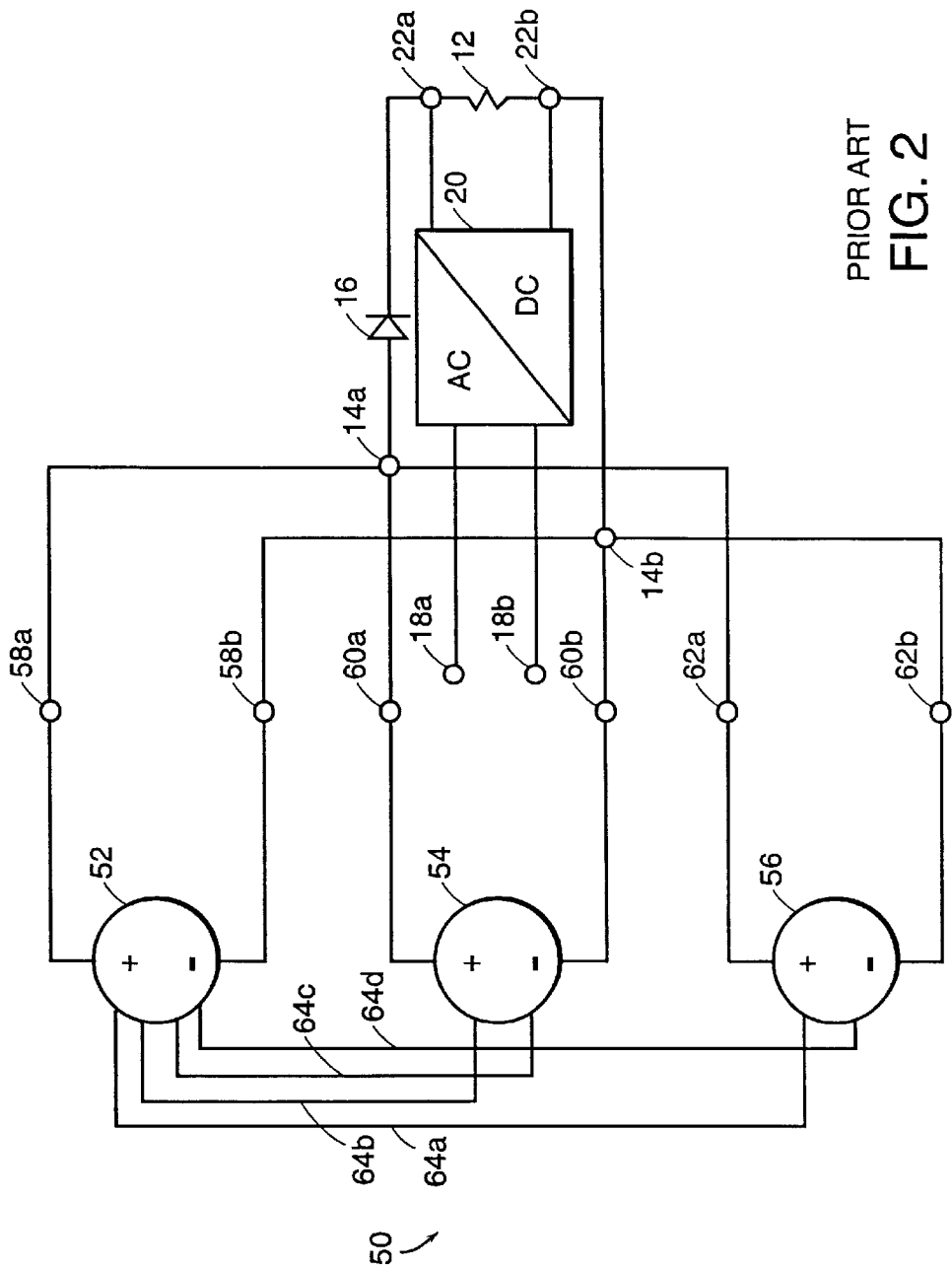
FIG. 2 is a schematic diagram of a prior art multiple flywheel energy storage system connected to a load.

Turning now to FIG. 2, a prior art multiple unit flywheel energy storage system 50 is shown coupled to the critical load 12. In the illustrated embodiment, the multiple unit flywheel energy storage system 50 has three flywheel energy storage units or sub-systems 52, 54, and 56. The multiple flywheel energy storage system 50, of course, could have any number of flywheel energy storage units or sub-systems 52, 54, 56, and the three units of FIG. 2 are merely exemplary. The flywheel energy storage sub-systems 52, 54 and 56 are connected in parallel through the terminals 58a, b, 60a, b, and 62a, b, respectively, to the terminals 14a, 14b. Thus, it will be understood from the Figure that the flywheel energy storage sub-systems 52, 54, and 56 are connected in parallel to the critical load 12. When the multiple unit flywheel energy storage system 50 is configured as a master-slave arrangement, one of the flywheel energy storage sub-systems 52, 54, 56 is the master. In the example of FIG. 2, the flywheel energy storage unit 52 might be designated as the master, while the flywheel energy storage units 54, 56 would be the slave units. Additional connecting and control circuitry 64a, b, c, d would be provided so that the master unit 52 could control the operation of the slave units 54, 56.

It will be appreciated that there is an inherent unreliability in a master-slave system, since the failure of the master unit 52 would render the entire multiple flywheel energy storage system 50 inoperable. It will be further appreciated that complicated and expensive connecting and control circuitry 64a, b, c, d is required to implement a master-slave arrangement.

The flywheel energy storage system 50 may, alternatively, be arranged as a non-master-slave system, in which each flywheel energy storage unit 52, 54, and 56 supplies an output voltage to the critical load 12. However, in this arrangement, the output voltages of each of the energy storage units 52, 54, and 56 differ. Here, only the unit 52, 54, 56 with the highest voltage would supply power to the critical load 12. For example, this might be the unit 52. The other units 54, 56 would not supply power to the critical load 12 until such time as one of them had the highest voltage of the three units 52, 54, 56. While a non-master-slave arrangement can eliminate some of the connecting and control circuitry 64a, b, c, d, resulting in a simpler system 50, it will be appreciated that a non-master-slave multiple unit flywheel energy storage system 50 cannot supply power to the load 12 greater than the amount that any single flywheel energy storage unit 52, 54, 56 can supply. As noted hereinbefore, only the flywheel energy storage unit 52, 54, 56 with the highest voltage can supply power to the load 12.

Figure 3:
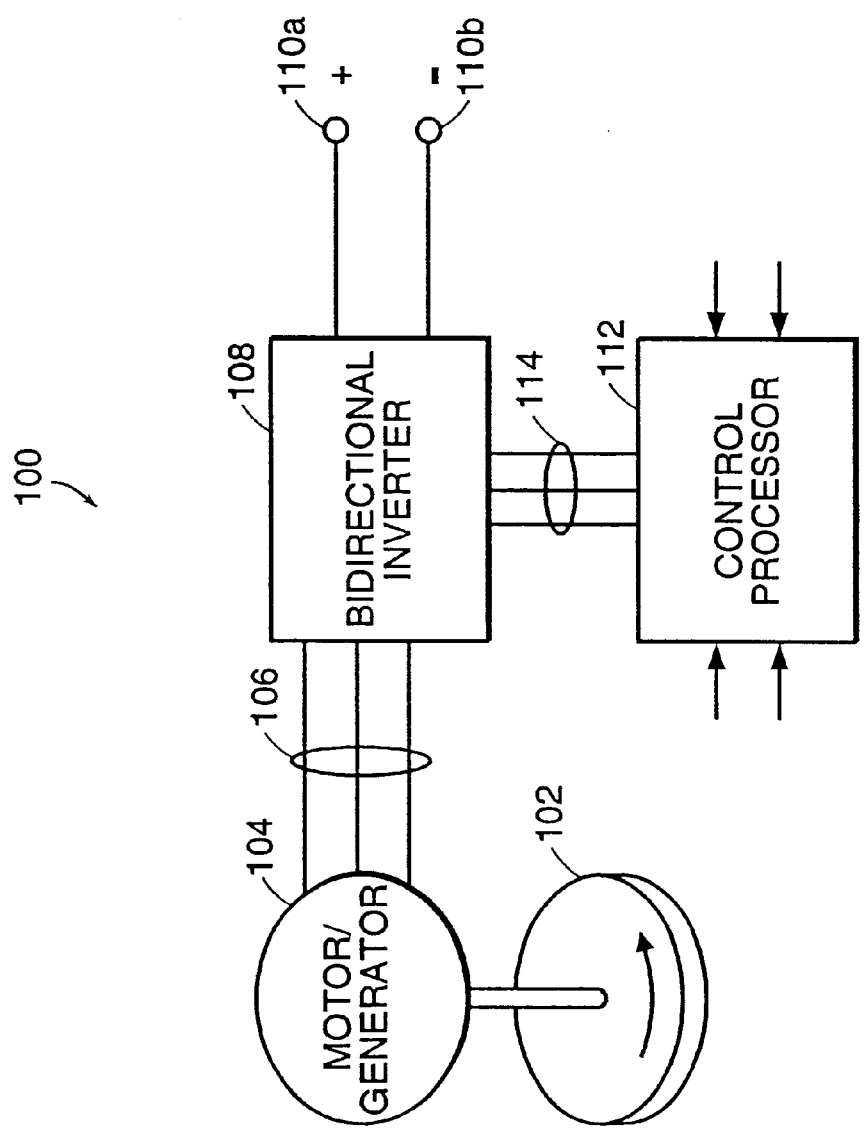
FIG. 3 is a block diagram of a single flywheel energy storage system according to the present invention.

Turning now to FIG. 3, a flywheel energy storage system unit 100 according to the present invention is disclosed. The flywheel energy storage system 100 includes a flywheel 102 mounted in a suitable housing (not shown) that turns at a relatively high rpm. The flywheel 102 turns, when not supplying power to the critical load 12, at an approximately constant rpm. The flywheel 102 is coupled to a motor/generator 104 through an appropriate mechanical connection (not shown). In one practical embodiment, the motor/generator 104 was a synchronous motor/generator. However, the motor/generator 104 need not be a nonsynchronous motor, and could be, for example, an induction motor. When the flywheel 102 is turning, the motor/generator 104 can set be set to function as a generator to produce three-phase alternating current (AC). When the three-phase AC current is supplied to the motor/generator 104 in the reverse direction, the motor/generator 104 functions as a motor to turn the flywheel 102. In such an instance, the motor/generator 104 serves to restore the flywheel 102 to its predetermined initial speed. The three-phase AC current from motor/generator 104 is supplied along the lines 106 to a bi-directional inverter 108. The bi-directional inverter 108 converts the three-phase AC current from the motor/generator 104 to a relatively constant DC current. In one exemplary embodiment, the bi-directional inverter 108 converted 120 volt AC current to 48 volts DC current. The bi-directional inverter 108 then supplies the DC current to the critical load 12 via output terminals 110*a, b*.

A person of ordinary skill will recognize that the flywheel 102 will have a tendency to slow down as time passes, even if no load 12 is applied thereto. When it is desired to return the flywheel 102 to its initial predetermined speed, DC current can be supplied from the bi-directional inverter 108 and the lines 106 to the motor/generator 104. The motor/generator 104 then functions as a motor to turn the flywheel 102 at a higher rpm.

The flywheel energy storage system 100 of FIG. 3 includes a digital signal processor 112 coupled by lines 114 to the bi-directional inverter 108. The digital signal processor 112 may be, for example, a model TMS320C240 digital signal processor sold by the Texas Instruments Company. The digital signal processor 112 may include suitable software programming in the form of microcode or other instructions to control the operations of the bi-directional inverter 108 and thence, the motor/generator 104 and the flywheel 102. Alternatively, the digital signal processor 112 could be an analog circuit or an application specific integrated circuit (ASIC) dedicated solely to the flywheel energy storage system 100. The operation of the digital signal processor 112 will be discussed more fully hereinbelow in connection with the flowchart of FIG. 7.

Figure 4:
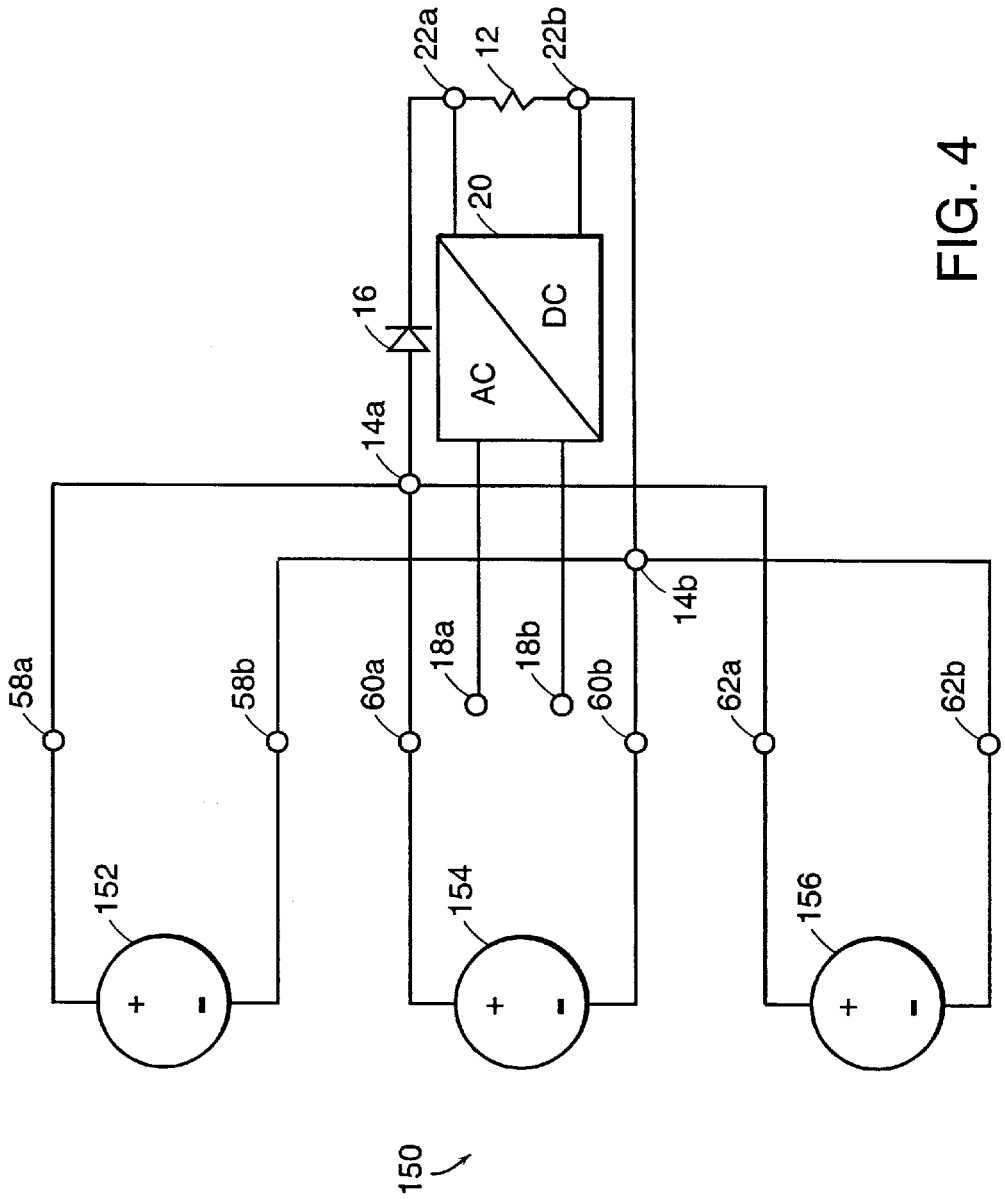
FIG. 4 is a schematic diagram of a multiple flywheel energy storage system according to the present invention connected to a load.

FIG. 4 illustrates a multiple flywheel unit energy storage system 150 according to the present invention that includes three flywheel energy storage units or sub-systems 152, 154, and 156. Each flywheel energy storage unit 152, 154, and 156 is as described in connection with FIG. 3. In the illustrated embodiment, the flywheel energy storage units 152, 154, and 156 are connected in parallel to the load 12 at the terminals 14*a*, 14*b*. It will be appreciated that there is no circuitry connecting the flywheel energy storage units 152, 154, 156 to each other. Each operates independently of the others in supplying power to the load 12.

Figure 5:
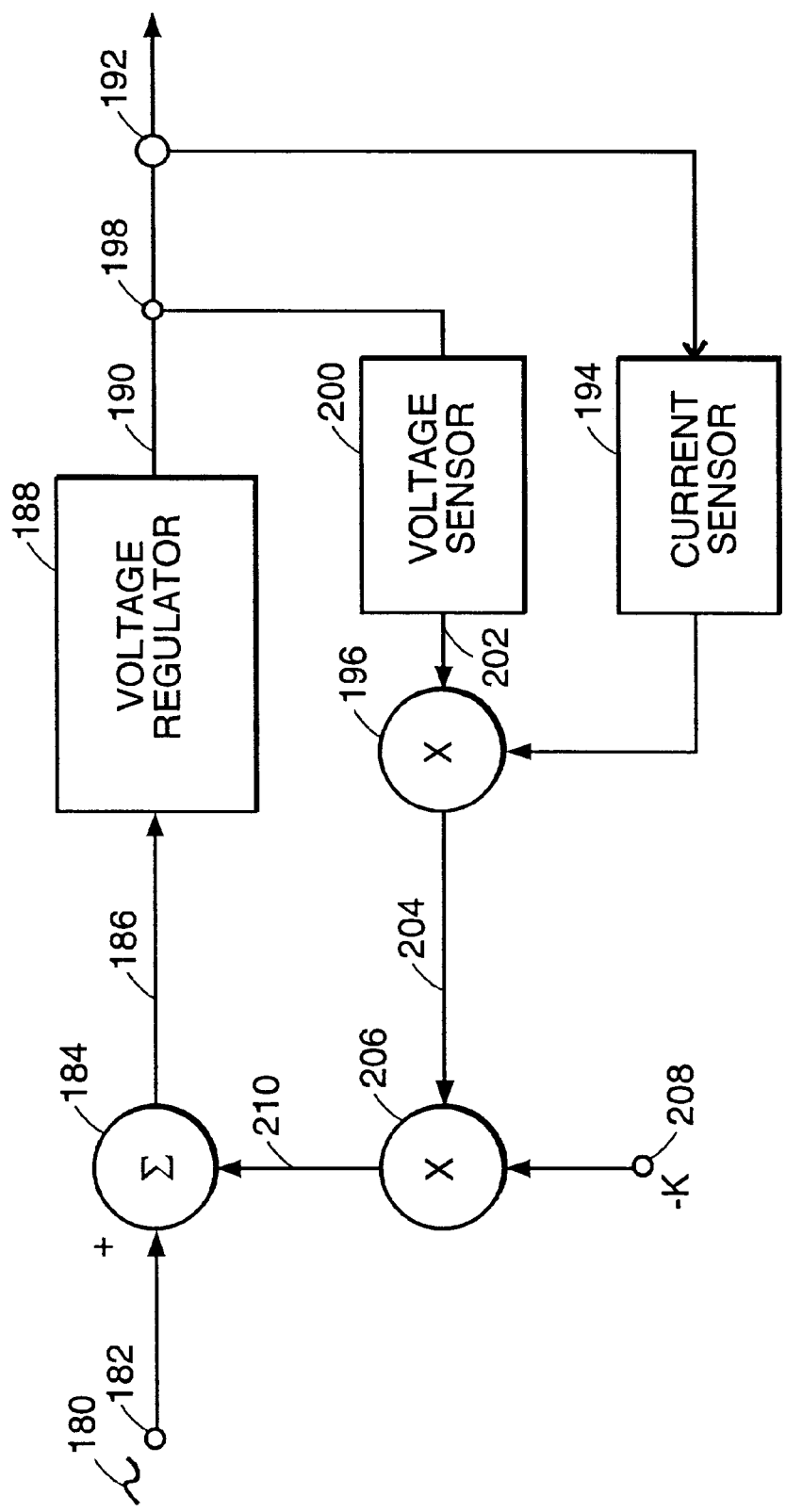
FIG. 5 is a schematic diagram of the power regulation circuit of the flywheel energy storage system of FIG. 3.
Figure 6:
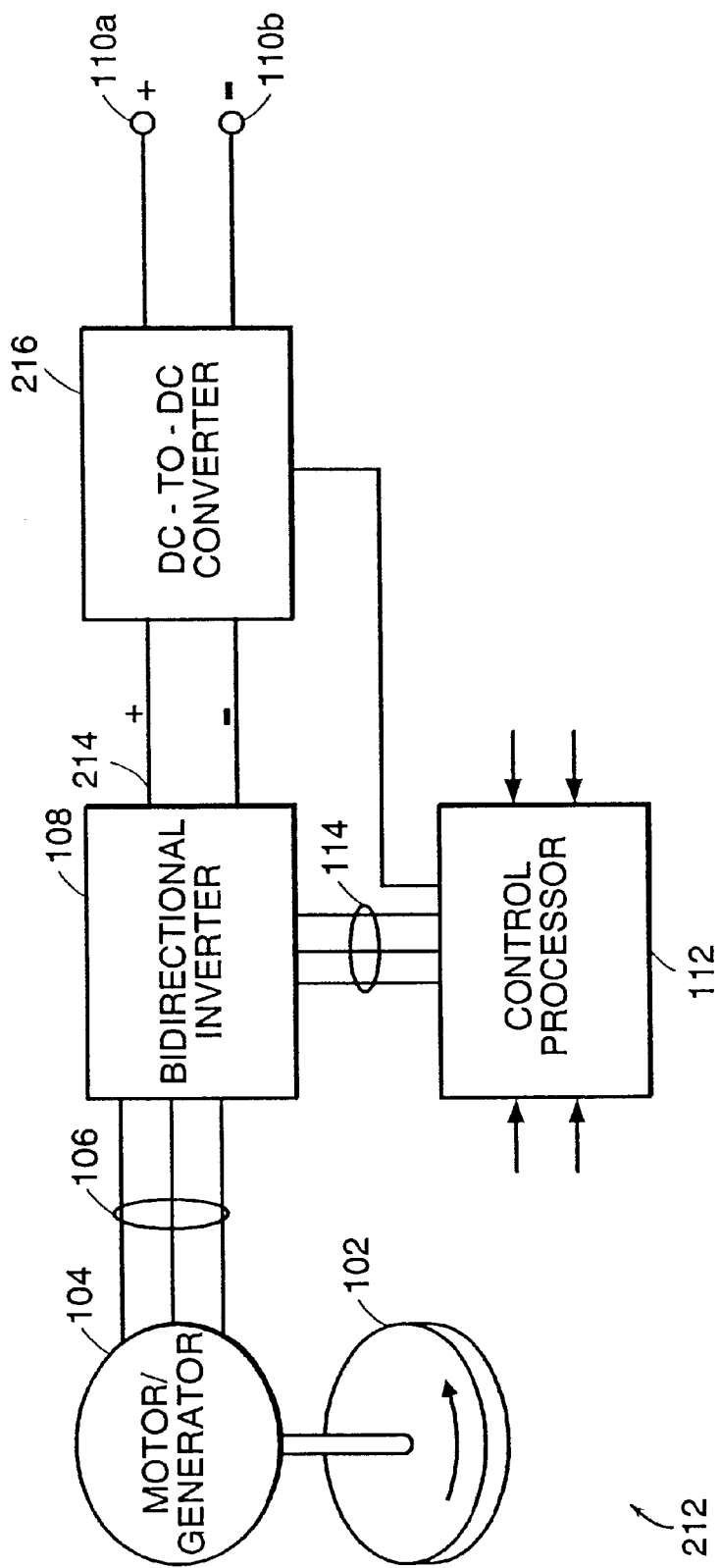
FIG. 6 is a schematic diagram of an alternate power regulation circuit of the flywheel energy storage system of FIG. 3.

FIG. 5 illustrates the power regulation circuit of the flywheel energy storage units 152, 154, 156 under control of the digital signal processor 112 (see FIGS. 3 and 6). The nominal output voltage 180 from the flywheel energy storage units 152, 154, 156 is supplied through a terminal 182 to a summing or adding circuit 184, which supplies at its output terminal a commanded output voltage 186 to a voltage regulator 188. The voltage regulator 188 supplies at its output terminal an actual output voltage 190 to the critical load 12 through a terminal 192. The actual output voltage 190 is supplied from the terminal 192 to a current sensor 194 and thence, to a multiplier circuit 196. The actual output voltage 190 from the voltage regulator 188 is also supplied through the terminal 198 to a voltage sensor 200. The voltage sensor 200 supplies an output signal 202 to the multiplier circuit 196. Collectively, the voltage sensor 200, the current sensor 194, and the multiplier circuit 196 comprise a power output calculation circuit that generates, at the multiplier circuit 196, a power output or calculated power signal 204. The power output signal 204 is the result of multiplying the voltage by the current, and is further supplied to a second multiplying circuit 206. A constant K 208 is multiplied by the power output signal 204 in the second multiplier circuit 206 to generate a correction signal 210. In one practical embodiment, K was selected to be a fraction in the range:

0<K<1.

The correction signal 210 is then added to the nominal output voltage 180 in the adding circuit 184 to generate the commanded output voltage 186.

FIG. 6 illustrates a second embodiment 212 of a power regulation circuit in a flywheel energy storage system according to the present invention that employs an intermediate voltage DC bus 214 for reduced size and cost and increased efficiency. The power regulation circuit 212 includes a DC to DC converter 216 that receives the DC current from the bi-directional inverter 108 along the intermediate voltage DC bus 214 and converts the signal to a lower voltage level DC signal. The lower voltage level DC signal is supplied to the load 12 at the output terminals 110*a, b*. In this embodiment, the intermediate voltage DC bus 214 permits the bi-directional inverter 108 to supply a DC current with a voltage higher than the nominal output voltage 180. The higher voltage signal from the bi-directional inverter 108 has a lower current value, resulting in smaller, lower cost cables, reduced voltage losses, and higher efficiency for the bi-directional inverter 108. In the illustrated embodiment, the digital signal processor 112 controls the power output signal of the DC to DC converter 216 rather than the power output signal of the bi-directional inverter 108 of FIG. 3. However, the operation of the digital signal processor 112 is the same as described hereinbefore in connection with FIG. 3.

Figure 7:
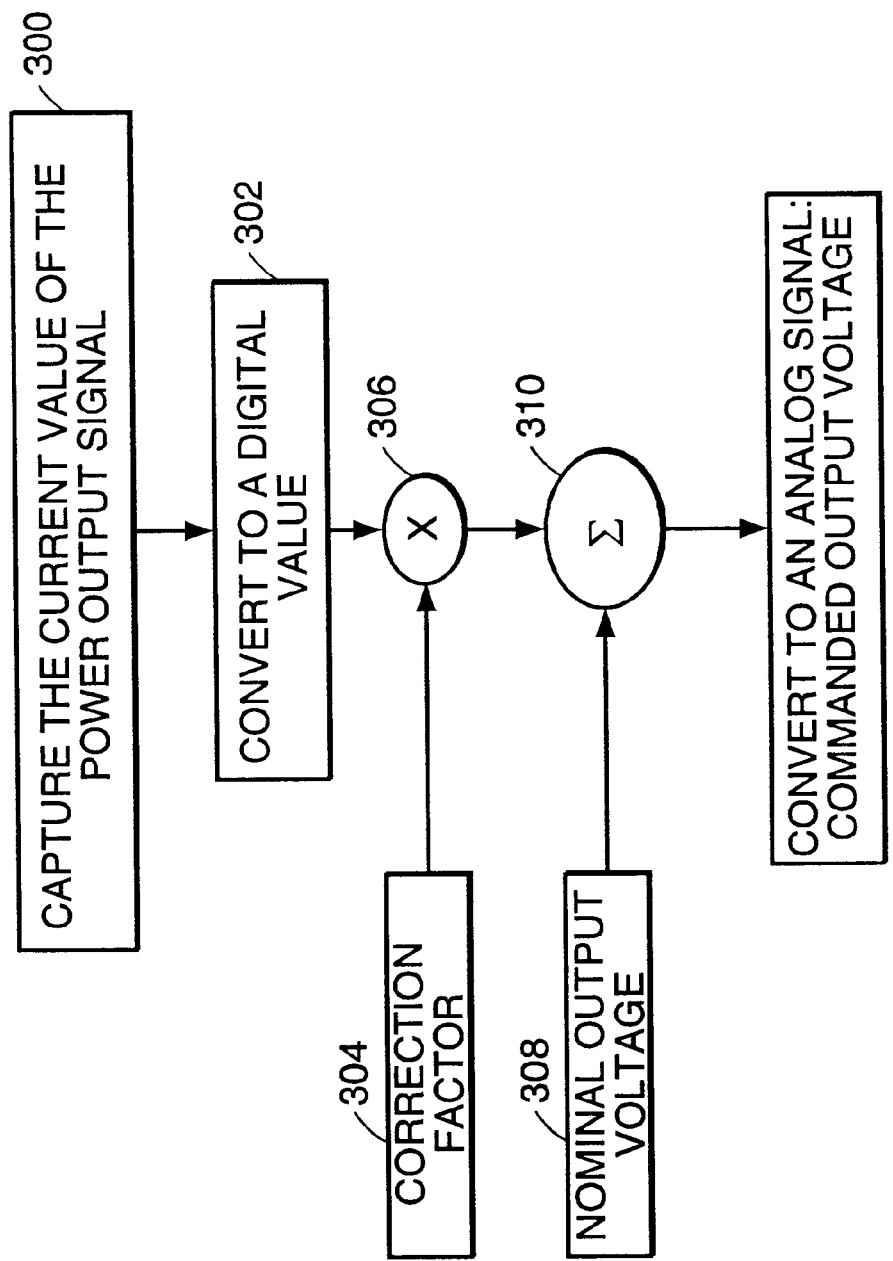
FIG. 7 is a flowchart for a software program used in the flywheel energy storage system of FIG. 3.

FIG. 7 is a flowchart depicting illustrative software used in the digital signal processor 112 of the embodiment of FIGS. 3 and 6. Program flow begins at step 300, where the program captures the current value of the power output signal 204. At step 302, the current value of the power output signal 204 is converted from an analog value to a digital value. The correction factor or constant K 208 is retrieved from memory at step 304 and is multiplied by the current value of the power output signal 204 from step 302 at step 306 to generate the correction signal 210. The nominal output voltage 180 is retrieved from memory at step 308, and the correction signal 210 is subtracted therefrom at step 310. The reduced signal from step 310 is converted back to an analog signal at step 312, and represents the commanded output voltage 186 of FIG. 5.

An embodiment of the present invention can be augmented with the use of speed measurement. This is most helpful when the multiple flywheels 102 have significantly different speeds at the beginning of discharge, or if the inaccuracy level of the output power calculation leads to significant speed differences between the flywheel energy storage sub-systems or units 152, 154, and 156 as they discharge. Neither is the case in the preferred embodiment of the present invention, and so speed measurement is preferably not utilized. In the instance when speed measurement is employed, it is used so that the amount of output voltage reduction is larger at lower speeds. This can be accomplished by multiplying K 208 (the correction factor) by the term:

$(1-\alpha^* \text{ Actual Speed/Full Speed})$, where:

$0 < \alpha < 1$.

It will be appreciated from the above description that an embodiment of the present invention possesses significant advantages over prior art flywheel energy storage systems. For example, an embodiment of the present invention is much more reliable than prior art master-slave flywheel energy storage systems. The failure of one flywheel energy storage sub-system or unit 152, 154, and 156 will not incapacitate the entire system 100, as will happen with the failure of the master unit 52 in a master-slave system 50. Further, an embodiment of the present invention is less complicated and is hence, more reliable, as no connections are required among the flywheel energy storage sub-systems or units 152, 154, and 156. Finally, a multiple flywheel energy storage system 100 according to the present invention can supply power to a much larger load 12 than a prior art flywheel energy storage system 50 without a master-slave arrangement with the same number of flywheel energy storage sub-systems or units 152, 154, and 156, as the power output signals from each flywheel energy storage sub-system or unit 152, 154, and 156 can be added to another and supplied to the load 12.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An electrical energy storage system for supplying power to a load comprising:
    a. a plurality of flywheel energy storage systems, each supplying a power output signal, each of said flywheel energy storage systems comprising:
        i. a flywheel turning at an initially predetermined rate;
        ii. a motor/generator coupled to said flywheel;
        iii. a bi-directional inverter circuit coupled to said motor/generator and to said load; and
        iv. a control circuit coupled to said motor/generator and said bi-directional inverter circuit for controlling said power output signal of said flywheel energy storage system;
        v. said control circuit being configured and arranged to control an actual output voltage of said power output signal responsive to a determination of an actual power output signal for said each of said flywheel energy storage systems and independently of the other of said flywheel energy storage systems; and
    b. a connector circuit connecting said flywheel energy storage systems to said load, said connector circuit not connecting said flywheel energy storage systems to each other.

2. The system of claim 1, wherein said control circuit includes a power output calculation circuit for calculating the power output of said power output signal and generating a calculated power signal in response thereto.

3. The system of claim 2, wherein said control circuit includes a multiplier circuit for multiplying said calculated power signal by a predetermined amount to generate a correction signal.

4. The system of claim 3, wherein said power output signal has a nominal output voltage, and wherein said control circuit includes a subtracting circuit for subtracting said correction signal from said nominal output voltage to generate an adjustment signal.

5. The system of claim 4, wherein said control circuit includes a circuit responsive to said adjustment signal for reducing said actual output voltage of said power output signal from said flywheel energy storage system, each of said circuits operating independently of the others in said flywheel energy storage systems.

6. The system of claim 5, wherein said power output signal of said flywheel energy storage system has a delivered power component, and wherein said control circuit includes a circuit for calculating said delivered power component of said flywheel energy storage system.

7. The system of claim 5, wherein said rate of said flywheel in said flywheel energy storage system changes, and wherein said control circuit includes a circuit for measuring the deceleration of said flywheel to control said power output of said power output signal.

8. The system of claim 1, wherein said motor/generator is a synchronous motor/generator.

9. The system of claim 1, wherein said control circuit is a digital signal processor with a memory for storing a program.

10. The system of claim 9, wherein said digital signal processor includes a power output calculation program for calculating the power output of said power output signal and generating a calculated power signal in response thereto.

11. The system of claim 10, wherein said digital signal processor includes a multiplier program for multiplying said calculated power signal by a predetermined amount to generate a correction signal.

12. The system of claim 11, wherein said power output signal has a nominal output voltage, and wherein said digital signal processor includes a subtracting program for subtracting said correction signal from said nominal output voltage to generate an adjustment signal.

13. The system of claim 12, wherein said digital signal processor includes a program responsive to said adjustment signal for reducing said actual output voltage of said power output signal from said flywheel energy storage system, each of said programs in each of said digital signal processors operating independently of the others in said flywheel energy storage systems.

14. The system of claim 13, wherein said power output signal of said flywheel energy storage system has a delivered power component, and wherein said digital signal processor includes a program for calculating said delivered power component of said flywheel energy storage system.

15. The system of claim 14, wherein said rate of said flywheel in said flywheel energy storage system changes, and wherein said digital signal processor includes a program for calculating the deceleration of said flywheel to control said power output.

16. The system of claim 1, and further comprising a DC to DC converter coupled to said bi-directional inverter circuit and said load, and wherein said control circuit is coupled to said DC to DC converter for controlling said power output signal of said flywheel energy storage system.

17. A method of supplying power to a load comprising the steps of:
    a. providing a plurality of flywheel energy storage systems, each of which generates a power output signal having a nominal output voltage;
    b. calculating an actual power output of each of said flywheel energy storage systems to generate a calculated power signal associated with each;
    c. multiplying each of said calculated power signals by a predetermined amount to generate an associated correction signal;
    d. subtracting each of the associated correction signals from each of said nominal output voltages; and e. reducing said actual output voltage of said power output signal of each of said flywheel energy storage systems in response to said subtracting step, wherein said calculating, multiplying, subtracting, and reducing are done by said each flywheel energy storage system independently of the others.

18. The method of claim 17, wherein said calculating step calculates the delivered power component of said associated flywheel energy storage system.

19. The method of claim 17, wherein said flywheel energy storage system includes a flywheel turning at a variable rate, and wherein said calculating step calculates the deceleration of said flywheel.

20. In a backup power supply with at least two flywheel energy storage systems, each of said at least two flywheel energy storage system comprising:
   a. a flywheel turning at an initially predetermined rate;
   b. a motor/generator coupled to said flywheel;
   c. a bi-directional inverter circuit coupled to said motor/generator; and
   d. a control circuit coupled to said motor/generator and said bi-directional inverter circuit for controlling the power output signal of said flywheel energy storage system;
   e. said control circuit being configured and arranged to control an actual output voltage of said power output signal responsive to a determination of an actual power output signal for said each of said flywheel energy storage systems and independently of the other of said flywheel energy storage systems.

21. The flywheel energy storage system of claim 20, wherein said control circuit includes a power output calculation circuit for calculating the power output of said power output signal and generating a calculated power signal in response thereto.

22. The flywheel energy storage system of claim 21, wherein said control circuit includes a multiplier circuit for multiplying said calculated power signal by a predetermined amount to generate a correction signal.

23. The flywheel energy storage system of claim 22, wherein said power output signal has a nominal output voltage, and wherein said control circuit includes a subtracting circuit for subtracting said correction signal from said nominal output voltage to generate an adjustment signal.

24. The flywheel energy storage system of claim 23, wherein said control circuit includes a circuit responsive to said adjustment signal for reducing said actual output voltage of said power output signal from said flywheel energy storage system, said circuit operating independently of the others in said flywheel energy storage systems.

25. The flywheel energy storage system of claim 24, wherein said power output signal of said flywheel energy storage system has a delivered power component, and wherein said control circuit includes a circuit for calculating said delivered power component of said flywheel energy storage system.

26. The flywheel energy storage system of claim 25, wherein said rate of said flywheel in said flywheel energy storage system changes, and wherein said control circuit includes a circuit for measuring the deceleration of said flywheel to control said power output of said power output signal.

27. The flywheel energy storage system of claim 20, wherein said motor/generator is a synchronous motor/generator.

28. The flywheel energy storage system of claim 20, wherein said control circuit is a digital signal processor with a memory for storing a program.

29. The flywheel energy storage system of claim 28, wherein said digital signal processor includes a power output calculation program for calculating the power output of said power output signal and generating a calculated power signal in response thereto.

30. The flywheel energy storage system of claim 29, wherein said digital signal processor includes a multiplier program for multiplying said calculated power signal by a predetermined amount to generate a correction signal.

31. The flywheel energy storage system of claim 30, wherein said power output signal has a nominal output voltage, and wherein said digital signal processor includes a subtracting program for subtracting said correction signal from said nominal output voltage to generate an adjustment signal.

32. The flywheel energy storage system of claim 31, wherein said digital signal processor includes a program responsive to said adjustment signal for reducing said actual output voltage of said power output of said flywheel energy storage system, said program in said digital signal processor operating independently of the others in said flywheel energy storage systems.

33. The flywheel energy storage system of claim 32, wherein said power output signal of said flywheel energy storage system has a delivered power component, and wherein said digital signal processor includes a program for calculating said delivered power component of said flywheel energy storage system.

34. The flywheel energy storage system of claim 33, wherein said rate of said flywheel in said flywheel energy storage system changes, and wherein said digital signal processor includes a program for calculating the deceleration of said flywheel to control said power output.

35. The flywheel energy storage system of claim 20, and further comprising a DC to DC converter coupled to said bi-directional inverter circuit and said load, and wherein said control circuit is coupled to said DC to DC converter for controlling said power output signal of said flywheel energy storage system.

36. A circuit for balancing the load of a plurality of flywheel energy storage systems, each of said flywheel energy storage systems supplying a power output signal with a nominal output voltage, comprising:
   a. power output calculation circuit for calculating an actual power output of each of said power output signals and generating a calculated power signal in response thereto for each of said flywheel energy storage systems;
   b. a multiplier circuit associated with each of said flywheel energy storage systems for multiplying each said calculated power signal by a predetermined amount to generate a correction signal for each of said flywheel energy storage systems;
   c. subtracting circuit associated with each of said flywheel energy storage systems for subtracting said correction signal determined for each of said flywheel energy storage systems from said nominal output voltage to generate an adjustment signal for each of said flywheel energy storage systems; and
   d. a circuit associated with each of said flywheel energy storage systems, said circuit being responsive to said adjustment signal and being configured and arranged to reduce said actual output voltage of said power output signal of each of said flywheel energy storage systems independently of the others.

37. The circuit of claim 36, wherein said flywheel energy storage system supplies a delivered power output signal having a delivered power component, and wherein said power output calculation circuit calculates said delivered power component of said delivered power output signal to generate said calculated power signal.

38. The circuit of claim 36, wherein said flywheel energy storage system includes a flywheel turning at a variable rate, and wherein said power output calculation circuit calculates the deceleration of said flywheel to control said power output signal.

39. In a multiple flywheel energy storage system wherein each flywheel unit supplies a power output signal with a nominal output voltage and has a digital signal processor, a computer program product comprising a computer usable medium having computer readable program code embodied in said medium for causing an application program to execute on said digital signal processor, said computer program code including:

a. a power output calculation program for calculating an actual power output of an associated one of said flywheel energy storage systems and generating a calculated power signal in response thereto;

b. a multiplier program for multiplying said calculated power signal by a predetermined amount to generate a correction signal;

c. a subtracting program for subtracting said correction signal from said nominal output voltage of said associated one of said flywheel energy storage systems to generate an adjustment signal; and d. a program responsive to said adjustment signal for reducing said actual output voltage of said power output signal of said associated one of said flywheel energy storage systems independently of the others.

40. The computer program product of claim 39, wherein said flywheel unit supplies a delivered power output signal having a delivered power component, and wherein said power output calculation program calculates said delivered power component of said delivered power output signal to generate said calculated power signal.

41. The computer program product of claim 39, wherein said flywheel unit includes a flywheel turning at a variable rate, and wherein said power output calculation program calculates the deceleration of said flywheel to control said power output signal.

42. A method of balancing the load of a plurality of flywheel energy storage systems, each of said flywheel energy storage systems supplying a power output signal having a nominal output voltage and a power output, comprising the steps of:

a. calculating an actual power output of each of said flywheel energy storage systems to generate a calculated power signal associated with each;

b. multiplying each of said calculated power signals from each of said flywheel storage systems by a predetermined amount to generate associated correction signals;

c. subtracting each of said associated correction signals from said nominal output voltages; and d. reducing said actual output voltage of said power output of each of said flywheel energy storage systems in response to said subtracting step, wherein said calculating, multiplying, subtracting, and reducing steps are done by said each flywheel energy independently of the others.

43. The method of claim 42, wherein said power output calculating step calculates the delivered power component of each of said flywheel energy storage systems.

44. The method of claim 42, wherein said flywheel energy storage system includes a flywheel turning at a variable rate, and wherein said power output calculating step measures the deceleration of said flywheel.

\* \* \* \* \*